United States Patent [19]

Fiore, Jr.

[11] Patent Number: 5,481,824

[45] Date of Patent: Jan. 9, 1996

[54] RUBBER BAND POWERED MOUSETRAP

[75] Inventor: Joseph F. Fiore, Jr., Lebanon, Pa.

[73] Assignee: Woodstream Corporation, Lititz, Pa.

[21] Appl. No.: 261,180

[22] Filed: Jun. 13, 1994

[51] Int. Cl.⁶ .................................................. A01M 23/24
[52] U.S. Cl. ........................................................ 43/85; 43/81
[58] Field of Search ................................... 43/77, 78, 85, 43/86, 81, 88

[56] References Cited

U.S. PATENT DOCUMENTS

| | | | |
|---|---|---|---|
| 2,005,489 | 6/1935 | Barrett | 43/81 |
| 2,059,164 | 10/1936 | Woods | 43/78 |
| 2,481,800 | 9/1949 | Tyler | 43/85 |
| 2,506,055 | 5/1950 | Benson | 43/85 |
| 2,510,655 | 6/1950 | Price | 43/85 |
| 2,562,417 | 7/1951 | De Vorsey | 43/81 |
| 2,603,029 | 7/1952 | Anderson | 43/85 |
| 4,122,625 | 10/1978 | Ohtsuka | 43/85 |

*Primary Examiner*—Kurt Rowan
*Attorney, Agent, or Firm*—Jacobson, Price, Holman & Stern

[57] ABSTRACT

A tunnel-type mousetrap has a central trapping mechanism powered by a rubber band. The rubber band is wound between an anchor plate in the top wall of the tunnel and a striker plate that fits over the anchor plate and has end walls with trapping apertures that project downwardly through the tunnel. The rubber band urges the striker plate upwardly, and the trap is set by pushing down on the striker plate to engage a pivotal trigger carried by the anchor plate. When a mouse enters the tunnel and dislodges the trigger, the striker plate springs upwardly under the force of the rubber band and traps the mouse's neck in one of the trapping apertures.

12 Claims, 3 Drawing Sheets

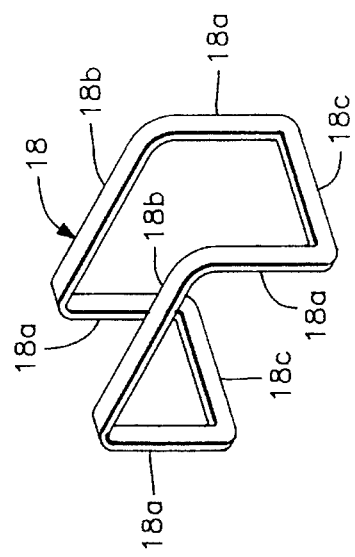
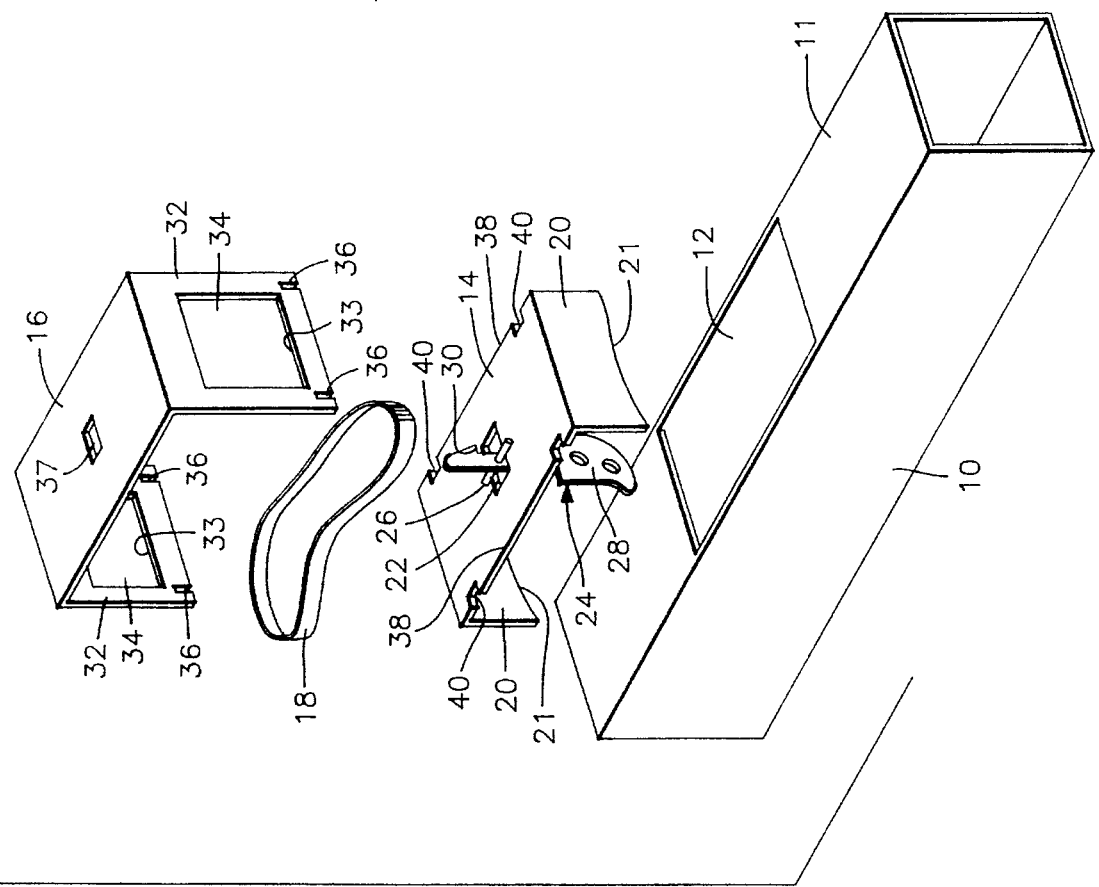

RUBBER BAND POWERED MOUSETRAP

BACKGROUND OF THE INVENTION

This invention relates to mousetraps.

One of the recent trends in mousetrap design, is the provision of disposable "no-see" mousetraps comprising an enclosure, such as a tunnel, in which a mouse is trapped, and which is intended for disposal with the trapped mouse inside, so that a user does not need to view the trapped mouse or mouse's corpse. Such traps may or may not provide some type of indicator to show when a mouse has been trapped.

SUMMARY OF THE INVENTION

One object of this invention is to provide an effective mousetrap which, at least in one embodiment, can be constructed as a disposable no-see mousetrap, preferably providing an indication of when a mouse has been trapped.

Another object of the invention is to provide a tunnel-type mousetrap in which a mouse can enter from either end of the tunnel to be trapped by a central trapping mechanism.

A further object of the invention is to provide a mousetrap with a trigger mechanism which is easy to set.

Still another object of the invention is to provide a mousetrap having a rubber band-powered trigger released trapping mechanism.

In fulfillment of the above and other objects, the invention provides, at least in its preferred form, a mousetrap having a tunnel-like enclosure open at each end with a centrally located rubber band powered trigger operated trapping mechanism. The design of the trap is such that a mouse, attracted by bait located in the region of the trapping mechanism trigger, enters the enclosure from either end, trips the trigger mechanism and is trapped within the tunnel. The enclosure may be of a disposable nature, for example it may be of cardboard or the like or alternatively may be made of more durable material, such as metal or plastic for repeated use.

The trapping mechanism may conveniently comprise an anchor plate attached to an upper wall of the tunnel and a cage-like striker plate with a rubber band wound over parts of the respective plates and urging the striker plate upwardly so that opposite end faces thereof approach adjacent end faces of the anchor plate. The anchor plate carries a pivotal trigger extending into the tunnel between opposite ends of the plates. To set the trap, a user need only push down on the upwardly urged striker plate until it is engaged and held down by the upper end of the trigger.

The trapping mechanism is configured such that when a mouse enters the tunnel from either end and moves the trigger with its head, the striker plate is released and springs upwardly under the force of the rubber band so that one of its end faces engages the mouse's neck from below and squeezes same against the corresponding end face of the anchor plate thereby trapping the mouse. An indication that a mouse has been trapped is given by the top of the striker plate having risen to its original level.

Preferably, the trigger is pivotally mounted crosswise of the tunnel so that it can be released by a mouse entering from either end. Also, the trap can be pre-baited, for example by impregnating the tunnel in the region of the trigger.

BRIEF DESCRIPTION OF THE DRAWINGS

FIG. 1 is an exploded perspective view of the components of a rubber band powered mousetrap according to the invention;

FIG. 3 is a perspective view of the rubber band;

DESCRIPTION OF THE PREFERRED EMBODIMENT

Figure 4:
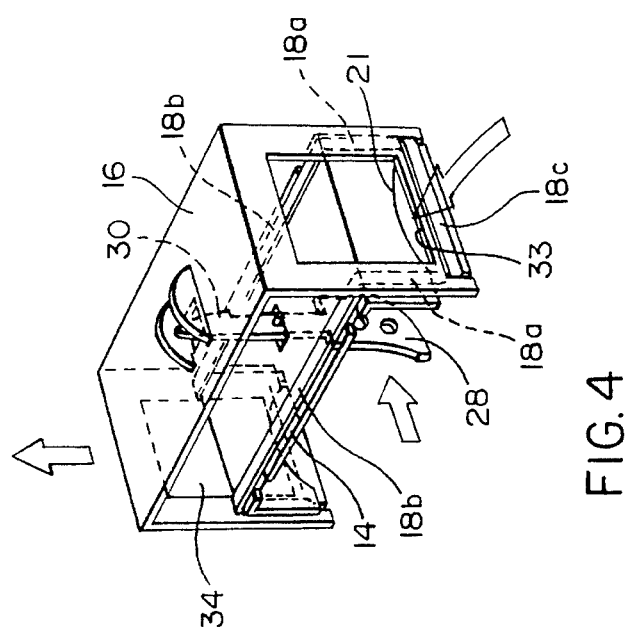
FIG. 4 is a perspective view of the trapped mechanism in a sprung position.

Referring initially to FIG. 1, a rubber band powered mousetrap includes an open-ended tunnel 10, preferably of cardboard or the like if the trap is to be of the disposable kind, but which can also be of plastic or other suitable material if the trap is to be of the re-usable kind. The tunnel is open at each end and is formed with a top wall 11 having a centrally located aperture 12 to receive a trapping mechanism which comprises a metal or plastic anchor plate 14, a metal or plastic striker plate 16 and an endless rubber band 18.

The anchor plate 14 has shallow depending end walls 20 preferably with arcuately profiled bottom edges 21 and a central aperture 22 in which is mounted a pivotal trigger 24 on a pivot axle 26 extending lengthwise of the anchor plate (relative to the tunnel 10). The trigger is thus mounted to pivot cross-wise in the tunnel and has a depending lobe 28 and an upper end with a catch or shoulder 30. The axle 26 may be attached to plate 14 by any suitable means.

Striker plate 16 is dimensioned to fit over the anchor plate 14 and the striker plate also has depending end walls 32 with enlarged rectangular apertures 34. The end walls 32 are somewhat deeper than the end walls 20 of the anchor plate, being approximately the depth of tunnel 10 and are dimensioned to slide over the end walls 20 as seen in FIGS. 2–4 whereby trapping apertures are formed at each end of the mechanism between the arcuate bottom edges 21 of the anchor plate and the lower edges 33 of the apertures 34 striker plate.

The rubber band 18 is wound between the anchor plate and the striker plate, in the configuration shown in FIG. 3. Thus, opposite ends of the band are fitted in notches 36 in the bottom of the striker plate and the band is run from the notches up between the end walls of the plates (runs 18a of the band), over the top of the plate 14 under plate 16 (runs 18b of the band) and across the bottom of plate 16 between notches 36 (runs 18c). The effect of the band winding is to urge the striker plate upwardly relative to the anchor plate into the sprung position of the mechanism shown in FIG. 4 where the striker plate is above the anchor plate and edges 33 of the striker plate approach edges 21 of the anchor plate.

Figure 5:
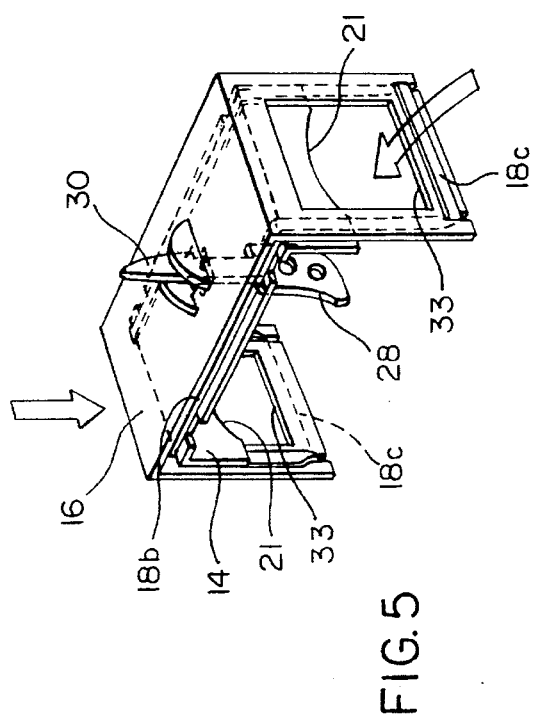
FIG. 5 is a perspective view of the trapping mechanism in the set position.

Striker plate 16 has a central aperture 37 through which the top end of trigger 24 projects. To set the trapping mechanism, striker plate 16 is simply pressed downwards against the force of the rubber band until the trigger catch 30 engages against one edge of aperture 37. The trap is thus held in the set position (FIGS. 2 and 5) with plate 16 adjacent plate 14 and with the edges 33 pushed downwardly away from the edges 21.

Figure 2:
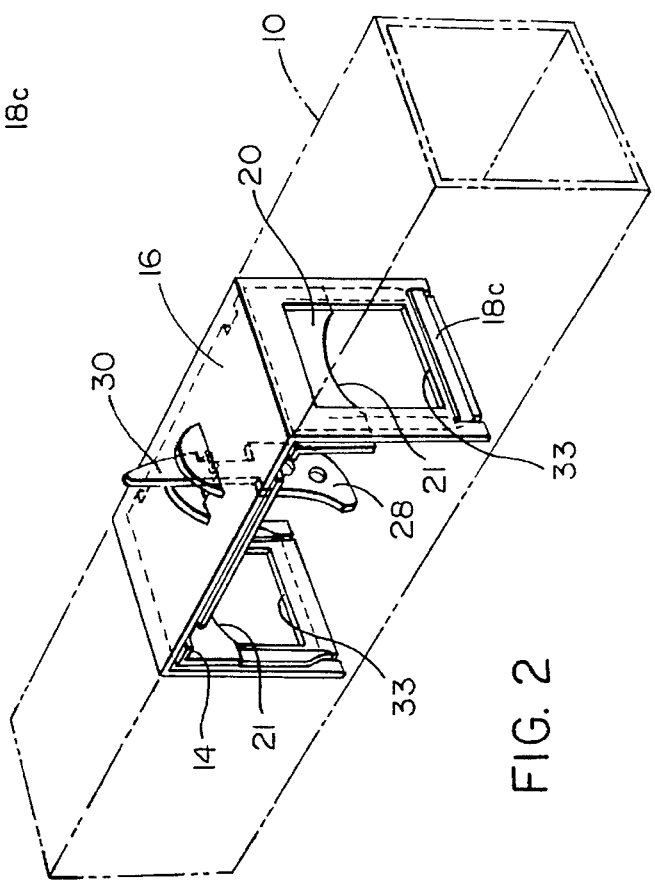
FIG. 2 is a perspective view of the assembled trap in a set position.

The trapping assembly may be fixed in position in tunnel aperture 12 by any convenient means, such that the anchor plate 14 is substantially flush with the top wall of the tunnel with the end walls of both plates projecting into the tunnel as shown in FIG. 2. To fix plate 14 in position, for example, the plate may have securing means such as edge flanges 38

(FIG. 1) which sit on the opposite side walls of the tunnel defining aperture 12 and notches 40 for receiving another endless rubber band (not shown) wound in a like configuration to band 18, over flanges 38, through the notches 40, down the opposite sides of the tunnel and across the bottom of the tunnel. This is only one way of mounting the trapping structure in the tunnel and numerous other arrangements are possible.

Figure 6:
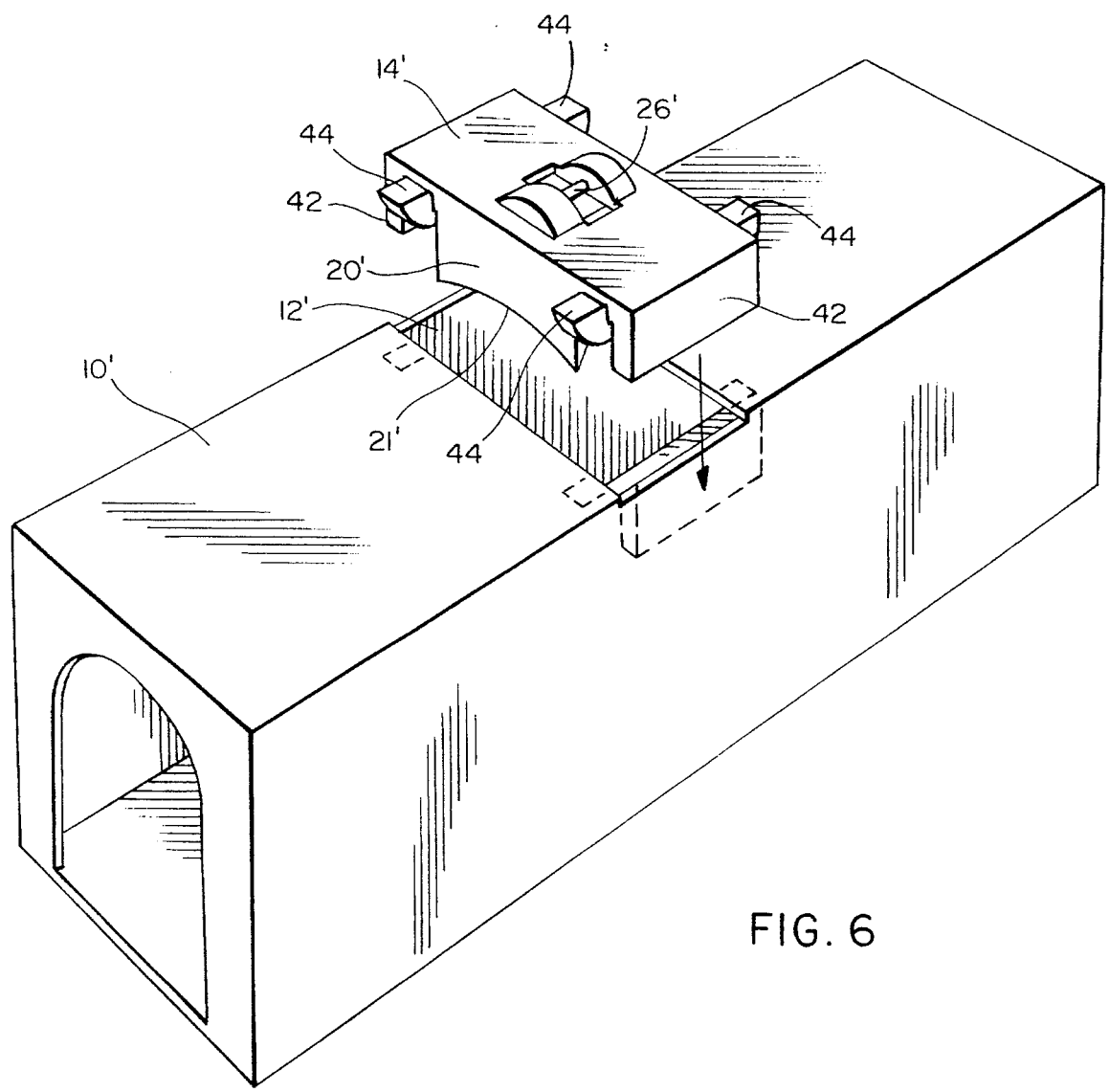
FIG. 6 is a perspective view of a modified trap, in which primed reference numerals are used to denote parts corresponding to similarly numbered parts in the previous figures.

FIG. 6, for example, shows an alternative, mounting arrangement for anchor plate 14' which in this case may be a plastic molding. Plate 14' has depending side flanges 42 to fit over the opposite side walls of tunnel 10' and curved surface ramp members 44 at its ends to fit under the top wall of the tunnel. The structure of the trapping mechanism and tunnel may otherwise be the same as in the previous embodiment.

With the trapping mechanism fitted in the tunnel as shown in FIG. 2 and the trapping mechanism in the sprung position shown in FIG. 4, in order to set the trap, it is simply necessary to push down on the striker plate 16 until the trigger catch 30 engages the striker plate. Then, when a mouse enters the tunnel from either end, sticks its head through one of the apertures 34 and dislodges the trigger with its snout, striker plate 16 springs up under the action of band 18 and catches the mouse's neck between edges 21 and 33. The mouse is thus trapped and cannot escape. The band 18 may have sufficient power to break the mouse's neck. An indication that the trap has been sprung is given by the raised striker plate. The tunnel may be suitably impregnated or pre-baited in the region of the trigger to attract mice.

While only a preferred embodiment of the invention has been described herein in detail, the invention is not limited thereby and modifications can be made within the scope of the attached claims.

I claim:

1. A trapping mechanism for a mousetrap, said mechanism comprising an anchor plate having depending end walls each formed with a lower edge, a striker plate to fit over the anchor plate, the striker plate having depending walls to fit outside the end walls of the anchor plate, the end walls of the striker plate being deeper than the end walls of the anchor plate and each having an aperture therein with a bottom edge spaced below the lower edge of the respective anchor plate end wall to form a trapping aperture therebetween, a resilient means to be fitted between the plates and provide a force urging the striker plate upwardly with respect to the anchor plate into a sprung position wherein said bottom edges of the apertures in the striker plate end walls approach the respective lower edges of the anchor plate end walls and wherein the striker plate can be pushed down against said force into a set position wherein said bottom edges are removed from said lower edges, and a trigger assembly carried by the anchor plate for releasably holding the striker plate in the set position.

2. A trapping mechanism as claimed in claim 1, wherein the resilient means comprises an endless rubber band having respective runs to fit around outside lower end portions of the striker plate end walls, up inside the striker plate end walls and over the anchor plate.

3. A trapping mechanism as claimed in claim 2, wherein said lower end portions of the striker plate end walls have notches to receive the rubber band.

4. A trapping mechanism as claimed in claim 1, wherein the trigger assembly comprises a trigger pivotally mounted in an aperture in the anchor plate, said trigger having a lobe portion extending below the anchor plate between the anchor plate end walls and a catch portion projecting above the anchor plate, the striker plate including an aperture to receive the catch portion of the trigger and having one edge to engage and retain the catch portion in the set position of the mechanism.

5. A trapping mechanism as claimed in claim 4, wherein the trigger is mounted on a pivot axle extending perpendicularly to the end walls of the anchor plate.

6. A trapping mechanism as claimed in claim 1, wherein the lower edges of the anchor plate end walls are arcuate.

7. A trapping mechanism as claimed in claim 1, in combination with an open ended tunnel having a top wall with an aperture to receive said trapping mechanism wherein the anchor plate includes means for securing same to the tunnel substantially flush with said top wall with said anchor plate end walls projected into the tunnel.

8. A trapping mechanism for a mousetrap comprising an anchor plate, a striker plate to fit over the anchor plate, the striker plate having opposite downwardly depending end walls each formed with an aperture having a bottom edge spaced below a corresponding edges of the anchor plate to form a trapping aperture therebetween, an endless rubber band to be wound between the plates and provide a force urging the striker plate upwardly with respect to the anchor plate into a sprung position wherein said bottom edges of the apertures in the striker plate and walls approach said corresponding edges of the anchor plate and wherein the striker plate can be pushed down against said force into a set position, the rubber band having respective portions to fit around outside lower end portions of the striker plate end walls, further portions to extend up inside the striker plate end walls, and still further portions to fit over the anchor plate, the mechanism further including a trigger assembly carried by the anchor plate for releasably holding the striker plate in the set position.

9. A trapping mechanism as claimed in claim 8, wherein the anchor plate has depending end walls shallower than the end walls of the striker plate, the end walls of the anchor plate having lower edges defining said corresponding edges.

10. A trapping mechanism as claimed in claim 9, wherein the trigger assembly comprises a trigger pivotally mounted in an aperture in the anchor plate, said trigger having a lobe portion extending below the anchor plate between the anchor plate end walls and a catch portion projecting above the anchor plate, the striker plate including an aperture to receive the catch portion of the trigger and having one edge to engage and retain the catch portion in the set position of the mechanism.

11. A trapping mechanism as claimed in claim 10, wherein the trigger is mounted on a pivot axle extending perpendicularly to the end walls of the anchor plate.

12. A trapping mechanism as claimed in claim 8, in combination with an open-ended tunnel wherein the anchor plate comprises a part of a top wall of the tunnel and the side walls of the striker plate extend into the tunnel.

\* \* \* \* \*